(12) United States Patent
Cobb et al.

(10) Patent No.: US 10,627,370 B2
(45) Date of Patent: Apr. 21, 2020

(54) ADDITIVE MANUFACTURE OF METAL OBJECTS; INSPECTION AND PART VALIDATION

(71) Applicant: Southwest Research Institute, San Antonio, TX (US)

(72) Inventors: Adam C. Cobb, San Antonio, TX (US); Albert J. Parvin, Jr., San Antonio, TX (US); Barron J. Bichon, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 95 days.

(21) Appl. No.: 15/962,903

(22) Filed: Apr. 25, 2018

(65) Prior Publication Data

US 2019/0331643 A1    Oct. 31, 2019

(51) Int. Cl.
| | | |
|---|---|---|
| *B23K 31/12* | (2006.01) | |
| *G01N 29/42* | (2006.01) | |
| *G01N 29/12* | (2006.01) | |
| *G01N 29/11* | (2006.01) | |
| *G01N 29/07* | (2006.01) | |

(52) U.S. Cl.
CPC ........... *G01N 29/07* (2013.01); *B23K 31/125* (2013.01); *G01N 29/11* (2013.01); *G01N 29/12* (2013.01); *G01N 29/42* (2013.01)

(58) Field of Classification Search
CPC ........ G01N 29/07; G01N 29/11; G01N 29/12; G01N 29/42; B23K 31/125
USPC .......................................................... 73/597
See application file for complete search history.

(56) References Cited

U.S. PATENT DOCUMENTS

| | | | | |
|---|---|---|---|---|
| 3,746,121 A | * | 7/1973 | Niklas | ...................... G01H 5/00 73/597 |
| 5,811,682 A | * | 9/1998 | Ohtani | ...................... B06B 1/04 73/622 |
| 6,008,887 A | * | 12/1999 | Klein | ...................... G01H 9/00 356/28.5 |
| 6,109,108 A | * | 8/2000 | Ohtani | ...................... B06B 1/04 73/599 |
| 6,257,048 B1 | * | 7/2001 | Hietala | ..................... G01N 3/38 73/24.01 |
| 6,382,029 B1 | * | 5/2002 | Shoureshi | .......... G01N 29/2412 340/652 |
| 6,534,964 B1 | * | 3/2003 | Sinha | ..................... G01N 29/50 324/71.1 |
| 2003/0167137 A1 | * | 9/2003 | Ohtani | ................... B21J 15/285 702/35 |
| 2004/0085550 A1 | * | 5/2004 | Okuno | ................... G01B 17/02 356/630 |
| 2007/0140310 A1 | * | 6/2007 | Rolton | ................... G01N 25/72 374/44 |

(Continued)

*Primary Examiner* — Jacques M Saint Surin
(74) *Attorney, Agent, or Firm* — Livingston Law Firm

(57) ABSTRACT

Methods of testing the material of a metal object made by additive manufacturing. An electromagnetic acoustic transducer (EMAT) is used to transmit long duration acoustic signals into the object, and to receive response signals representing resonance of acoustic waves within the material. At least one resonance peak is identified and used to determine attenuation and/or wave velocity. These values can then be used to determine material properties, such as porosity, Shear Modulus, Young's Modulus, or Poisson's Ratio.

10 Claims, 4 Drawing Sheets

(56) References Cited

U.S. PATENT DOCUMENTS

| | | | | |
|---|---|---|---|---|
| 2009/0044627 A1* | 2/2009 | Brady | ................ | G01N 29/2406 73/643 |
| 2011/0167914 A1* | 7/2011 | Sutherland | ................ | F17D 1/00 73/643 |
| 2014/0318251 A1* | 10/2014 | Chatellier | .............. | G01N 29/07 73/597 |

* cited by examiner

- SHEAR MODULUS (G): $G = \rho c_S^2$
- YOUNG'S MODULUS (E): $E = \dfrac{c_L^2 \rho (1+\upsilon)(1-2\upsilon)}{1-\upsilon}$
- POISSON'S RATIO ($\upsilon$): $\upsilon = \dfrac{1-2(c_S/c_L)^2}{2-2(c_S/c_L)^2}$

ADDITIVE MANUFACTURE OF METAL OBJECTS; INSPECTION AND PART VALIDATION

TECHNICAL FIELD OF THE INVENTION

This invention relates to additive manufacturing, and more particularly to a nondestructive test method for inspecting metal objects manufactured by additive manufacturing.

BACKGROUND OF THE INVENTION

"Additive manufacturing" refers to a process of making three-dimensional objects under computer control with material being added together (such as liquid molecules or powder grains being fused together). Unlike material removed from a stock in a machining process, additive manufacturing builds the three-dimensional object by successively adding material layer by layer.

The manufactured objects can be of almost any shape or geometry and typically are produced using digital model data from a computer file. There are different additive manufacturing technologies, such as stereolithography or fused deposit modeling.

The term "3D printing" originally referred to a process that deposits a binder material onto a powder bed with inkjet printer heads, layer by layer. More recently, the term is being used in popular vernacular to encompass a wider variety of additive manufacturing techniques. However, global technical standards use the term "additive manufacturing" in this broader sense, since the goal of additive manufacturing is to achieve mass-production, in contrast to 3D printing for rapid prototyping.

Additive manufacturing is an emerging technology that promises a host of improvements compared to conventional manufacturing, such as allowing production of more complex components and reducing manufacturing waste. However, additive manufacturing is vulnerable to flaws that are unique to the production process. These flaws result in uncertainty in the mechanical properties of components, such as porosity and local material property variations.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a nondestructive evaluation (NDE) method for detecting and quantifying flaws in metal objects made with additive manufacturing (AM). The method allows parts and other objects to be qualified and certified for their intended use quickly and inexpensively.

More specifically, and as explained below, the method is a field-deployable NDE solution that can be used to qualify AM objects based on their microstructural properties. The method focuses on quantifying variations resulting from defects unique to AM objects. The basis of the method is to perform accurate measurements of acoustic parameters. These parameters are then used to qualify the material microstructure to determine if the object can be certified for use.

Figure 1:
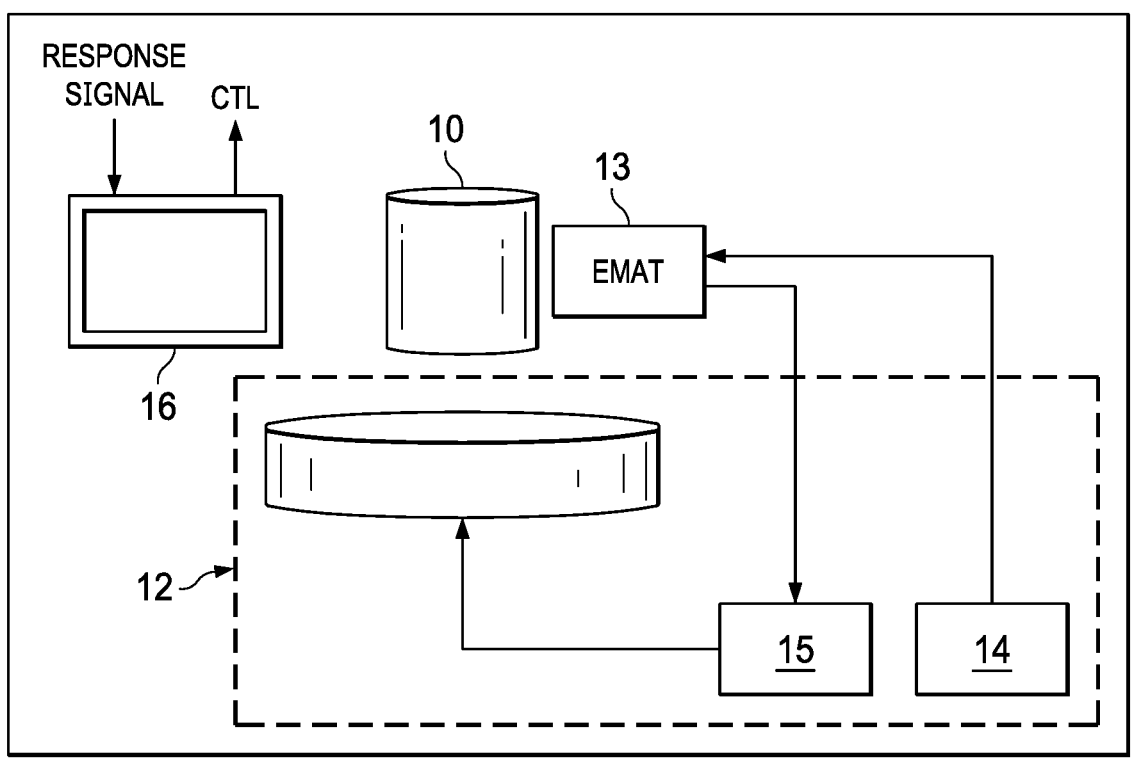
FIG. 1 illustrates a system for testing additive manufactured (AM) objects in accordance with the invention.

FIG. 1 illustrates an inspection station 12 for inspecting a number of AM parts 10 in accordance with the invention. Although the objects to be inspected are referred to herein as "parts", that term is used in its most general sense to refer to any discrete three-dimensional object.

Inspection station 12 implements the computer process described herein. A control unit 16 has a user interface, and has processing hardware and software for implementing the tasks described herein. Control unit 16 receives measurement signals, and controls other hardware of measurement station 12, as well as provides a user interface for measurement station 12 and for reporting results of testing.

An electromagnetic acoustic transducer (EMAT) 13 generates and transmits long-duration acoustic signals into a part 10 being inspected. The transmitted signals have a duration that exceeds the time it takes for the sound to reverberate in the material.

In addition to the EMAT 13, a transmitter 14 energizes EMAT 13 with single-frequency sinusoidal signals. A high precision receiver 15, such as a superheterodyne receiver, quantifies the signal energy at the transmit frequency, and delivers measurement signals to control unit 16.

In operation, EMAT 13 is activated by sending a single-frequency long-duration signal to it. By "long-duration" is meant that the signal transmitted into the part 10 has many cycles of the same sine wave that all have the same wavelength. The goal is to send so many cycles that the acoustic waveform has time to bounce back and forth between the boundaries of the part being tested. As a result, early parts of the acoustic wave interact with later parts.

Figure 2:
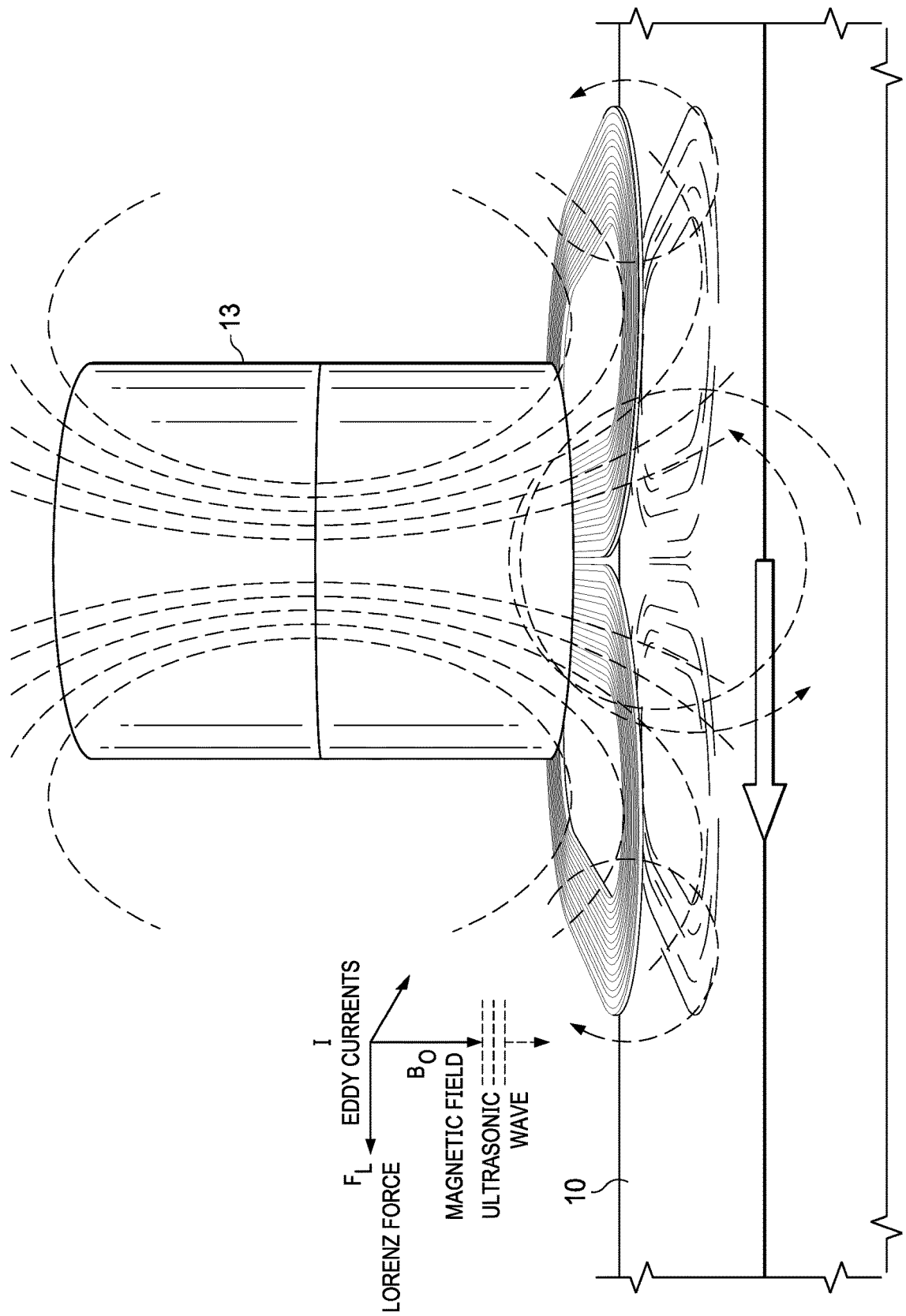
FIG. 2 illustrates the operation of the EMAT of FIG. 1.

FIG. 2 illustrates the operation of EMAT 13. When the test object 10 is close to the EMAT 13, ultrasonic waves are generated in the object through the interaction of two magnetic fields. Depending on the configuration of the EMAT 13, shear waves or longitudinal waves can be generated.

The long-duration signals overlap with themselves as they reverberate in the material of part 10. If the wavelength of sound generated is an integer multiple of the material thickness, it will constructively interfere with itself and produce a strong signal. By sweeping in frequency, it is possible to measure which wavelengths establish these resonance states.

Two acoustic measurements of interest are acoustic attenuation of the signal amplitude and wave velocity. For attenuation, the time it takes for the sound to decay from the resonance amplitude is directly related to the attenuation. For wave velocity, with a known specimen thickness (d), the wave velocity (c) is computed using the $n^{th}$ resonance peak $f_n$ by the following relationship:

$$c = \frac{2df_n}{n}.$$

Measured wave velocities are acoustic shear ($c_2$) and longitudinal ($c_L$) wave velocities. For isotropic materials, these wave velocities can be used to compute many different material property values.

Figures 3, 4:
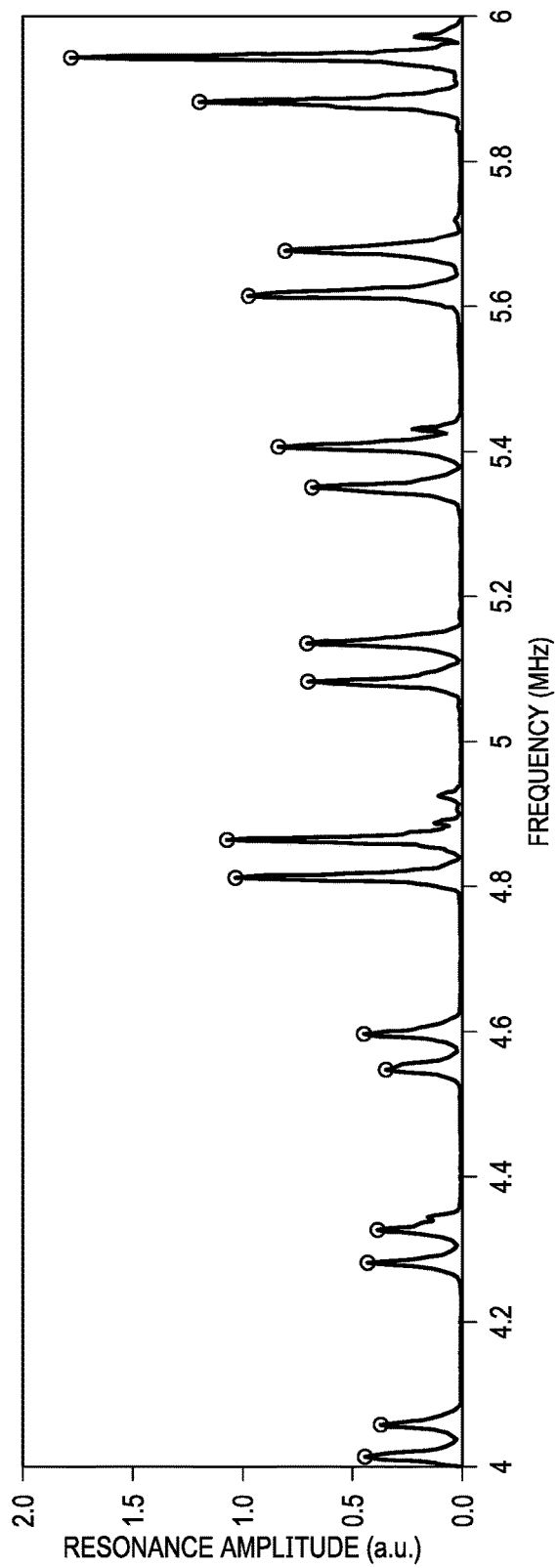
FIG. 3 illustrates material characteristics that can be evaluated with the method, based on wave velocity.
FIG. 4 illustrates an example of a response signal used for velocity measurement.

FIG. 3 illustrates material property values that can be computed from wave velocity, where p is the density of the material. These include Shear Modulus, Young's Modulus, and Poisson's Ratio. Material properties such as these are important for characterizing AM objects. For example, Young's modulus (elastic modulus) measures the resistance of a material to elastic deformation under load. It has been shown that both grain size and porosity affect the elastic moduli of a material, thus giving an indication of material build quality. For direct metal laser sintering (a type of AM), both the grain structure and consistency of the part (i.e. lack of porosity) are key characteristics to the overall quality of the AM object.

Attenuation, the other acoustic parameter of interest, is the reduction in signal amplitude partially due to scattering. The attenuation time can be measured for either shear or longitudinal waves. Acoustic attenuation can be used to qualitatively detect the presence of porosity in the manufactured material. Porosity is a commonly occurring defect in AM objects, and affects various mechanical properties, including material strength and fatigue life. Experimentation indicates that porosity increases the acoustic attenuation from sound scattering in the material. Thus, by monitoring attenuation, it is possible to detect porosity and inform the manufacturer that the object has potentially undesirable characteristics.

FIG. 4 illustrates an example of a response signal used for velocity measurement, and the ability to resolve two different shear wave speeds. More specifically, FIG. 4 is a resonance spectrum acquired on a 5.85 mm thick aluminum plate using a shear-wave EMAT 13. Given a nominal shear wave speed of 3.15 mm per microsecond and the plate thickness, there should be a resonance peak approximately every 270 kHz. As shown, there are regularly spaced pairs of peaks in the resonance spectrum. The pairs of peaks are produced because this material supports two different shear wave speeds depending on the polarization of the wave with respect to the manufacturing rolling direction. The resonance peaks for the two different wave speeds can be distinguished, and based on these peaks, the two shear wave speeds are measured as 3.1345 mm per microsecond and 3.1530 mm per microsecond. From this example, it is clear that the method described herein can discriminate between two different speeds less than 0.6% apart.

Figure 5:
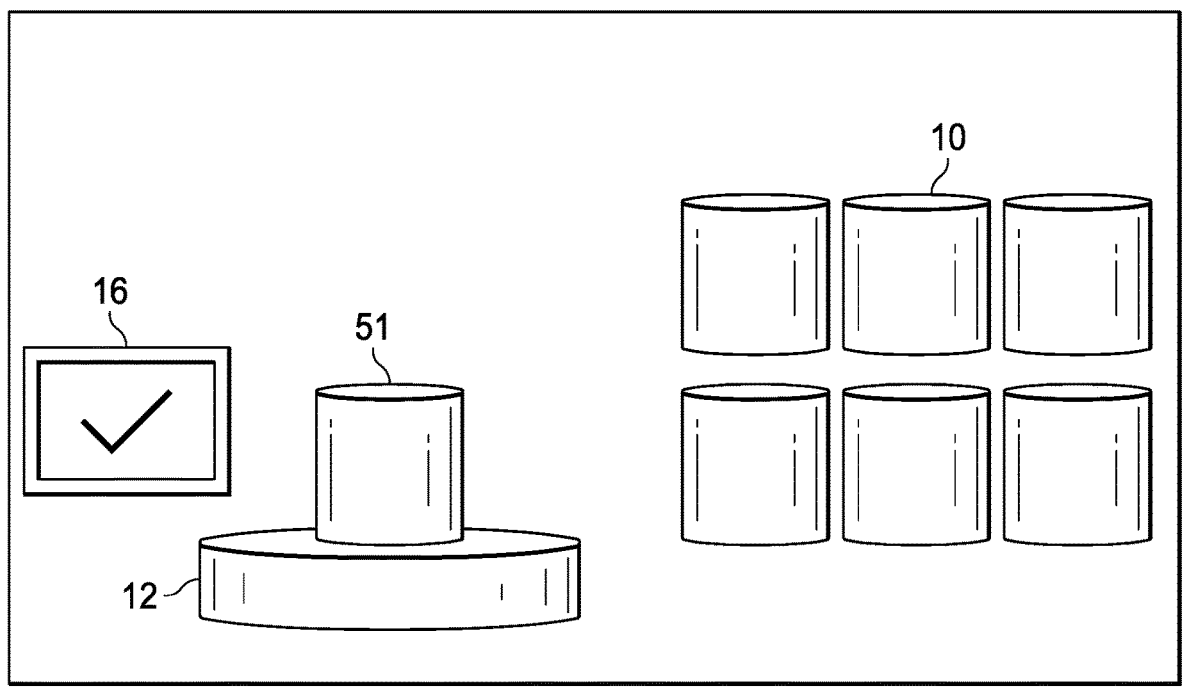
FIG. 5 illustrates a calibration step of the test method.
Figure 6:
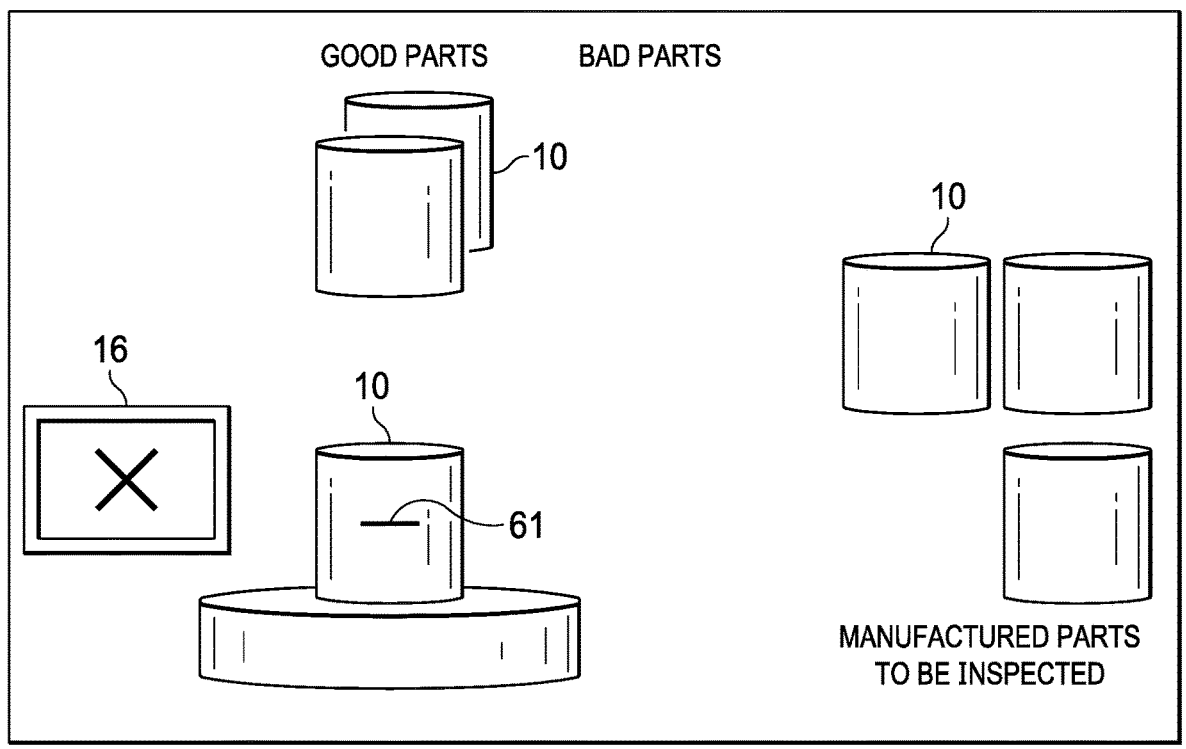
FIG. 6 illustrates the test method in progress for several AM parts.

FIGS. 1, 5 and 6 illustrate a method of testing objects made by applied manufacturing, in accordance with the invention.

Referring again to FIG. 1, an inspection station 12 is set up, comprising an EMAT sensor 13 and other instrumentation. As explained above, the inspection station 12 is operable to perform high resolution, resonance-based acoustic measurements.

FIG. 5 illustrates how inspection station 12 is calibrated. A known-good calibration piece 51 has been produced with the same AM process as the objects 10 to be tested. The calibration piece 51 has the same geometry as the objects 10, and has their desired material properties. The process of FIG. 5 is used to baseline the pass criteria of the inspection station 12.

FIG. 6 illustrates the inspection process for a number of AM objects 10. The object 10 currently being tested has a defect 61.

If an object 10 is good, it will fall within the calibrated pass criteria. If the object 10 is bad (has a defect) 61, that part will not be within the pass criteria and will be rejected.

Control unit 16 may be programmed to display or otherwise output the results of testing for each object 10. If an object does not pass inspection, control unit 10 may display or sound an alert so that the object 10 can be removed from production stock. A more sophisticated graphical user interface can be used for alerts and reporting, as well as to configure and control EMAT 13.

What is claimed is:

1. A method of testing the material of a metal object made by an additive manufacturing process, comprising:
   acquiring a calibration value from a known good object made by the same additive manufacturing process, using an electromagnetic acoustic transducer (EMAT);
   using the EMAT to transmit transmitted acoustic signals into the object;
   wherein the transmitted acoustic signals have a time duration exceeding the usual time to reverberate within the material of the object;
   using the EMAT to receive a response signal representing resonance of acoustic waves within the material;
   identifying at least one resonance peak in the response signal;
   measuring the time for the response signal to decay from the resonance peak;
   determining measured attenuation value based on the measuring step;
   comparing the measured attenuation value to the calibration value; and
   evaluating porosity of the material, based on the comparing step.

2. The method of claim 1, wherein the step of using the EMAT to transmit is performed sweeping through transmit frequencies.

3. The method of claim 1, wherein the acoustic signals are shear waves.

4. The method of claim 1, wherein the acoustic signals are longitudinal waves.

5. A method of testing the material of a metal object made by an additive manufacturing process, comprising:
   acquiring a calibration value from a known good object made by the same additive manufacturing process, using an electromagnetic acoustic transducer (EMAT);
   using an electromagnetic acoustic transducer (EMAT) to transmit transmitted acoustic signals into the object;
   wherein the transmitted acoustic signals have a time duration exceeding the usual time to reverberate within the material of the object;
   using the EMAT to receive a response signal representing resonance of acoustic waves within the material;
   identifying at least one resonance peak in the response signal;
   measuring a wave velocity of the response signal, based on the material thickness and the resonance peak frequency;
   using the wave velocity to calculate one of more of the following properties of the material: Shear Modulus, Young's Modulus, or Poisson's Ratio, thereby obtaining a measured property of the material;
   comparing the measured property to the calibration value; and
   accepting or rejecting the object, based on the comparing step.

6. The method of claim 5, wherein the step of using the EMAT to transmit is performed sweeping through transmit frequencies.

7. The method of claim 5, wherein the acoustic signals are shear waves.

8. The method of claim 5, wherein the acoustic signals are longitudinal waves.

9. An inspection station for testing the material of a metal object made by an additive manufacturing process, comprising:
- an electromagnetic acoustic transducer (EMAT) operable to transmit transmitted acoustic signals into the object, and to receive a response signal representing resonance of acoustic waves within the material;
- wherein the transmitted acoustic signals have a time duration exceeding the usual time to reverberate within the material of the object;
- a control unit operable to perform the following tasks: to store a calibration value acquired from a known good object made by the same manufacturing process, using an EMAT; to identify at least one resonance peak in the response signal, measure a wave velocity of the response signal, based on the material thickness and the resonance peak frequency; and to use the wave velocity to calculate one of more of the following property values of the material: Shear Modulus, Young's Modulus, or Poisson's Ratio; and to perform a comparison of the property value to the calibration value.

10. An inspection station for testing the material of a metal object made by an additive manufacturing process, comprising:
- an electromagnetic acoustic transducer (EMAT) operable to transmit transmitted acoustic signals into the object, and to receive a response signal representing resonance of acoustic waves within the material;
- wherein the transmitted acoustic signals have a time duration exceeding the usual time to reverberate within the material of the object;
- a control unit operable to perform the following tasks: to store a calibration value acquired from a known good object made by the same manufacturing process, using an EMAT; to identify at least one resonance peak in the response signal, measure the time for the response signal to decay from the resonance peak, determine an attenuation value based on the measuring step, to perform a comparison of the attenuation value to the calibration value, and evaluate porosity of the material, based on the results of the comparison.

\* \* \* \* \*